(12) United States Patent
Takiguchi et al.

(10) Patent No.: US 6,884,477 B1
(45) Date of Patent: Apr. 26, 2005

(54) ELECTROLUMINESCENCE DEVICE USING LIQUID CRYSTAL COMPOUND

(75) Inventors: Takao Takiguchi, Tokyo (JP); Shinjiro Okada, Isehara (JP); Akira Tsuboyama, Sagamihara (JP); Takashi Moriyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 302 days.

(21) Appl. No.: 09/722,642

(22) Filed: Nov. 28, 2000

(30) Foreign Application Priority Data

Nov. 29, 1999 (JP) ............................................ 11-337902
Sep. 12, 2000 (JP) ...................................... 2000-276772
Nov. 27, 2000 (JP) ...................................... 2000-360214

(51) Int. Cl.$^7$ .......................... C09K 19/00; C09K 19/32
(52) U.S. Cl. .................. 428/1.1; 252/299.62; 349/193; 349/187
(58) Field of Search ......................... 428/1.1, 1.2, 1.21, 428/1.22, 1.23–1.28, 690, 917, 1.4; 252/299.01, 299.62, 299.63, 299.65, 299.66, 299.3; 349/182, 183, 193, 187

(56) References Cited

U.S. PATENT DOCUMENTS

| | | | | |
|---|---|---|---|---|
| 5,076,963 A | * | 12/1991 | Kameyama et al. ... | 252/301.36 |
| 5,641,427 A | * | 6/1997 | Shinjo et al. .......... | 252/299.01 |
| 5,695,684 A | | 12/1997 | Kosaka et al. ......... | 252/299.61 |
| 5,766,510 A | | 6/1998 | Hanna et al. .......... | 252/299.62 |
| 6,124,046 A | * | 9/2000 | Jin et al. .................... | 428/690 |

FOREIGN PATENT DOCUMENTS

| | | |
|---|---|---|
| EP | 864631 A2 | 9/1998 |
| JP | 7-309838 | 11/1995 |
| JP | 9-316442 | 9/1997 |
| JP | 10-312711 | 11/1998 |

OTHER PUBLICATIONS

C.W. Tang et al., "Organic Electroluminescent Diodes," 51(12) *Appl. Phys. Lett.* 913–915 (1987).
Chigrim, et al., "Observation of Total omnidirectional reflection from a one–dimensional dielectric lattice", 68, Appl. Phys. 25–28 (1999).

* cited by examiner

*Primary Examiner*—Shean C. Wu
*Assistant Examiner*—Jennifer R. Sadula
(74) *Attorney, Agent, or Firm*—Fitzpatrick, Cella, Harper & Scinto

(57) ABSTRACT

An electroluminescence device contains a carrier transporting layer comprising a liquid crystal compound represented by

$$R-X-A-B-X'-R' \quad (I),$$

wherein A and B denote a naphthalene-2,6-diyl skeleton optionally substituted with one or two of F, Cl, Br, $CH_3$ and $CF_3$, at least one of A and B comprising a naphthalene-2,6-diyl skeleton having one to four CH groups replaced with N; X and X' denote —O—, —S—, —OOC— or —COO—; and one of R and R' denotes H, F, Cl, Br, $CF_3$ or a linear or branched alkyl group having 1–20 carbon atoms, and the other one of R and R' denotes a linear or branched alkyl group having 3–20 carbon atoms, said alkyl groups being independently capable of including one methylene group which can be replaced with —O—, —S—, —CH=CH— or —C≡C— so long as heteroatoms are not adjacent to each other.

15 Claims, 3 Drawing Sheets

ELECTROLUMINESCENCE DEVICE USING LIQUID CRYSTAL COMPOUND

BACKGROUND OF THE INVENTION

Field of the Invention and Related Art

The present invention relates to an electroconductive device including a carrier transporting layer comprising a liquid crystal compound, particularly a liquid crystal compound which has at least two π-electron conjugated systems, each comprising two fused 6-membered rings and having at least one nitrogen atom in the π-electron conjugated systems.

An applied study on bar-shaped liquid crystal materials has been extensively conducted principally in the field of display devices.

In recent years, by utilizing a self-organization property or alignment structure of a liquid crystal, the liquid crystal is provided with an electroconductivity to be used in a carrier transporting layer, such as an electron transporting layer or a hole transporting layer. For example, Hanna et al. has reported that a smectic liquid crystal is applicable to a material for a carrier transporting layer (Japanese Laid-Open Patent Application (JP-A) 10-312711 and JP-A 9-316442, and Ohyo Butsuri, Appl. Phys., vol. 68, No. 1 (1999)). According to the report, a certain smectic liquid crystal exhibits a carrier mobility of ca. $10^{-2}$ $cm^2/V.sec$, which is a maximum value among those given by organic compounds except for molecular crystals and also corresponds to that of amorphous silicon.

Further, as is generally known, in the case of a crystal assuming a polydomain, its domain boundary functions as a larger trap level (carrier conduction obstacle), thereby hindering carrier transport. On the other hand, in the case of a certain liquid crystal (a compound exhibiting mesomorphism), it has been confirmed that its domain boundary does not function as a trap level, whereby carrier transport function is not hindered.

Examples of such a liquid crystal compound may include the following compounds.

Phase transition temperature (° C.)

Cryst. $\xrightarrow{79}$ SmB $\xrightarrow{101}$ SmA $\xrightarrow{121}$ Iso.

Cryst.: crystal phase
SmB: smectic B phase
SmA: smectic A phase
Iso.: isotropic phase Phase transition temperature (° C.)

Cryst. $\xrightarrow{90}$ SmA $\xrightarrow{100}$ Iso.

Both the above compounds exhibit a carrier mobility of ca. $10^{-3}$ $cm^2/V.sec$.

Since T. W. Tang et al. substantiated in 1987 that it is possible to effect high brightness luminescence under the application of a low DC voltage by utilizing a lamination structure comprising a film of a fluorescent metal chelate complex and a diamine-based molecular film, an applied study on an organic electroluminescence (EL) device as a luminescence device with high speed responsiveness and high efficiency has been extensively conducted. The organic EL device is a self-light emitting device of a carrier injection type using luminescence occurring at the time of recombination of electrons and holes which reach a luminescent layer.

Figure 4:
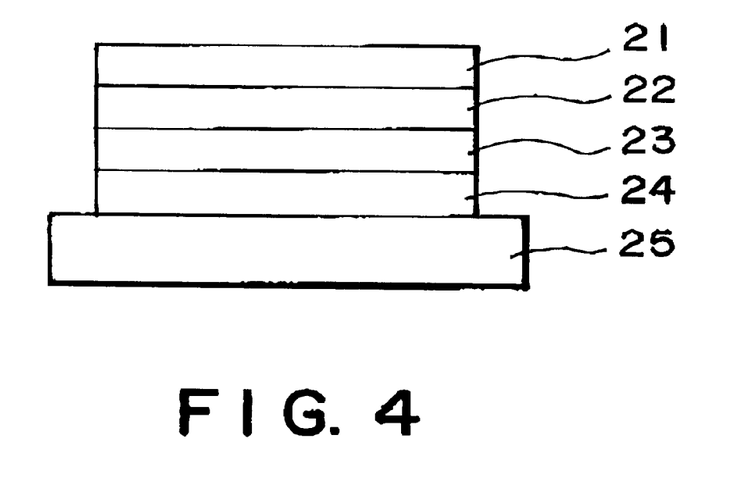
FIGS. 4 and 5 are, respectively, a schematic sectional view of an embodiment of an ordinary organic EL device.

FIG. 4 shows a structure of an ordinary organic EL device.

Referring to FIG. 4, the EL device includes a transparent substrate 25, and thereon layers of a transparent electrode 24, a hole transporting layer 23, a luminescent layer 22 and a metal electrode 21 successively disposed in this order. Between the metal electrode 21 (as a cathode) and the transparent electrode 21 (as an anode) for taking out emitted light, organic compound layers comprising the luminescence layer 22 and the hole transporting layer 23 are formed and disposed each in a thickness of ca. several hundred Å. Examples of the cathode metal electrode 21 may include a metal or an alloy having a smaller work function, such as aluminum, aluminum-lithium alloy and magnesium-silver alloy. Examples of the anode transparent electrode 24 may include an electroconductive material having a larger work function, such as ITO (indium tin oxide). The organic compound layer in this structure (FIG. 4) has a two-layer structure comprising the luminescence layer 22 and the hole transporting layer 23.

Figure 5:
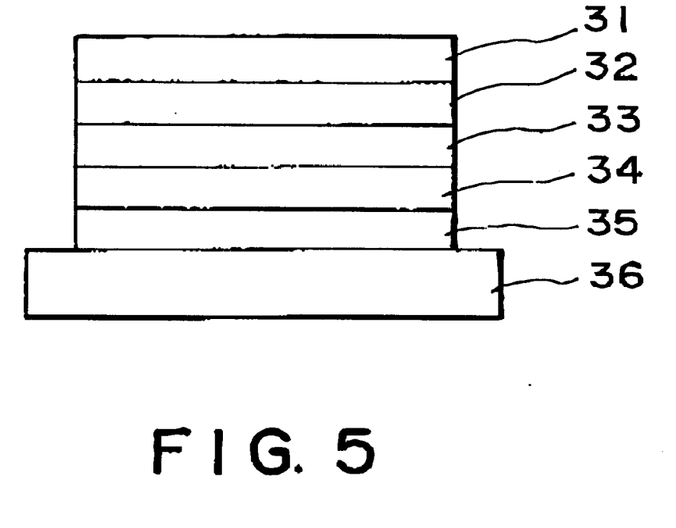

FIG. 5 shows another structure of an ordinary organic EL device.

Referring to FIG. 5, the EL device includes a transparent substrate 36 on which a transparent electrode 35 (anode), a hole transporting layer 34, a luminescence layer 33, an electron transporting layer 32 and a metal electrode 31 (cathode) are sequentially disposed in this order. In this case, an organic compound layer has a three-layer structure comprising the electron transporting layer 32, the luminescence layer 33 and the hole transporting layer 34.

Generally, the hole transporting layer (e.g., 23 in FIG. 4 and 34 in FIG. 5) has a function of efficiently injecting holes from the anode (transparent electrode 24 or 35) into the luminescence layer (22 or 33). On the other hand, the electron transporting layer (e.g., 32 in FIG. 5) generally has a function of efficiently injecting electrons from the cathode (metal electrode 31) into the luminescence layer 33.

These hole transporting layer and electron transporting layers also have an electron (carrier) blocking function and a hole (carrier) blocking function, respectively, thus enhancing a resultant luminescence efficiency.

For these carrier (hole and electron) transporting layers, it is important to exhibit a sufficient charge (carrier) transporting ability, particularly a carrier mobility.

Generally, an organic compound in an amorphous state exhibits a carrier mobility of ca. $10^{-5}$ $cm^2/V.sec$ which is insufficient for carrier transport. Accordingly, if the mobility in the carrier transporting layer is increased, more carriers can be injected into the luminescence layer to enhance the luminescence efficiency. In addition, the higher mobility is also effective in increasing a thickness (e.g., ca. 1 µm) of the carrier transporting layer (generally, several hundred Å-thick). As a result, it becomes possible to prevent an occurrence of short circuit and improve productivity.

For this reason, at present, a compound (material) for the carrier transport layer has been extensively developed in order to achieve a high luminescence efficiency of the organic EL device. In this regard, in order to provide a higher mobility, it has been practiced to impart mesomorphism to an organic compound for the carrier transport layer as described above. However, the resultant carrier mobility is still insufficient.

Incidentally, as a liquid crystal material exhibiting high speed responsiveness to an applied voltage (i.e., a good switching performance) for use in various liquid crystal devices, many liquid crystal compounds have been known. Examples of this may include those described in, e.g., U.S. Pat. No. 5,695,684 (JP-A 7-309838).

SUMMARY OF THE INVENTION

In view of the above-mentioned problem, a principal object of the present invention is to provide an electroconductive device including a carrier transporting layer comprising a liquid crystal compound suitable for efficiently transporting carriers (holes or electrons).

A specific object of the present invention is to provide an electroconductive device including a carrier transporting layer comprising a liquid crystal compound capable of improving a carrier mobility and/or carrier injection performance from an electrode to provide a high electroconductivity.

According to the present invention, there is provided an electroconductive device comprising: a pair of electrodes and a carrier transporting layer disposed between the electrode, wherein the carrier transporting layer comprises a liquid crystal compound represented by the following formula (I):

wherein A and B independently denote a naphthalene-2,6-diyl skeleton optionally substituted with one or two substituents selected from the group consisting of F, Cl, Br, $CH_3$ and $CF_3$, at least one of A and B comprising a naphthalene-2,6-diyl skeleton having one to four CH groups replaced with N; wherein X and X' independently denote a single bond, —O—, —S—, —OOC— or —COO—; and wherein one of R and R' denotes H, F, Cl, Br, $CF_3$ or a linear or branched alkyl group having 1–20 carbon atoms, and the other one of R and R' denotes a linear or branched alkyl group having 3–20 carbon atoms, said alkyl groups for R and R' being independently capable of including one methylene group which can be replaced with —O—, —S—, —CH=CH— or —C≡C— with the proviso that heteroatoms are not adjacent to each other.

According to the present invention, there is also provided a process for producing the above-mentioned electroconductive device comprising at least the following step (a) or (b):

(a) a step of forming a carrier transporting layer comprising a liquid crystal compound of formula (I) described above so as to be in contact with at least one of a pair of electrodes formed in advance, or (b) a step of forming at least one of a pair of electrodes so as to be in contact with a carrier transporting layer formed in advance comprising a liquid crystal compound of formula (I) described above.

According to the present invention, there is further provided a display apparatus including the above-mentioned electroconductive device as a display device.

These and other objects, features and advantages of the present invention will become more apparent upon consideration of the following description of the preferred embodiments of the present invention taken in conjunction with the accompanying drawings.

DESCRIPTION OF THE PREFERRED EMBODIMENTS

In order to realize a high electroconductivity by applying an electric field to a liquid crystal compound via a pair of electrodes sandwiching the liquid crystal compound, it is necessary to satisfy several conditions, such as good carrier (electron or hole) injection performance and high (carrier) mobility.

Heretofore, a relatively good hole injection and/or transporting material has been found in the development of organic luminescence devices, but an electron injection and/or transporting material exhibiting sufficient performance has not yet been found.

In the present invention, it has been found that the liquid crystal compound of the above-mentioned formula (I) is effective and suitable for carrier transport (particularly an electron injection and/or transport) in a carrier transporting layer of an electroconductive device (organic EL device).

In formula (I) described above for the liquid crystal compound of the carrier transporting layer constituting the electroconductive device of the present invention, each of the naphthalene-2,6-diyl skeletons for A and B may preferably be selected from the group consisting of quinoline-2,6-diyl, isoquinoline-3,7-diyl, quinoxaline-2,6-diyl, [1,5]naphthyridine-2,6-diyl, [1,6]naphthyridine-3,7-diyl, [1,7]naphthyridine-2,6-diyl, [1,8]naphthyridine-2,6-diyl, quinazoline-2,6-diyl, cinnoline-3,7-diyl, pyrido[2,3-b]pyrazine-2,6-diyl, pyrido[2,3-b]pyrazine-3,7-diyl, pyrazino[2,3-b]pyrazine-2,6-diyl, pteridine-2,6-diyl, and naphthalene-2,6-diyl.

Further, in formula (I), R, R', X, X', A and B may preferably satisfy the following relationships:

R=R', X=X' and A=B, thus providing a symmetrical structure.

Further, in formula (I), either A or B may preferably be quinoline-2,6-diyl, or both A and B may preferably be quinoline-2,6-diyl.

The liquid crystal compound of formula (I) used in the present invention is selected based on the following molecular design factors (1) to (3):

(1) Lowering LUMO (Lowest Unoccupied Molecular Orbital) Level

Electron transport is effected by hopping conduction on LUMO of liquid crystal molecules. Accordingly, it is important to improve electron injection from an electrode to LUMO. Generally, in view of the chemical stability of the electrode, it is difficult to decrease a work function of the electrode. As a result, a key feature for the improved electron injection is how to lower the LUMO level of a liquid crystal compound used.

From the above viewpoint, we have calculated HOMO (highest occupied molecular orbital) levels and LUMO levels of several ring structures (capable of constituting the liquid crystal compound of formula (I) used in the present invention) according to the molecular orbital method in order to predict the LUMO level of the liquid crystal compound. As the molecular orbital method, in the present invention, a semiempirical computation (molecular orbital) method (the AM1 method) is used.

The results are as follows.

| | | HOMO | LUMO |
|---|---|---|---|
| | quinoline | −9.2 | −0.47 |
| | isoquinoline | −9.2 | −0.56 |
| | quinoxaline | −9.6 | −0.68 |
| | [1,5]naphthyridine | −9.7 | −0.67 |
| | [1,6]naphthyridine | −9.5 | −0.77 |
| | [1,7]naphthyridine | −9.5 | −0.76 |
| | [1,8]naphthyridine | −9.8 | −0.71 |
| | quinazoline | −9.5 | −0.77 |
| | pyrido[2,3-b]pyrazine | −10.0 | −0.93 |

-continued

| | | HOMO | LUMO |
|---|---|---|---|
| | pyrido[2,3-b]pyrazine | −9.9 | −1.21 |
| | naphthalene | −8.7 | −0.27 |

As shown above, compared with naphthalene, naphthalene skeletons having 1–4 nitrogen atoms (substituted for corresponding CH group(s) of naphthalene) can lower the LUMO level of naphthalene.

Accordingly, by using such a heterocyclic fused ring structure as a skeleton of a liquid crystal compound, a resultant electron injection performance from an electrode is expected to be improved based on lowering the LUMO level.

(2) Symmetry of Molecular Structure

As described in (1), the electroconductivity of a liquid crystal compound is based on the hopping conduction, which varies largely depending on the magnitude of the overlap integral of the π-electron cloud between adjacent liquid crystal molecules. It is important to increase the overall integral of the π-electron cloud in order to improve electron conductivity. For the electron conduction, it is possible to use a smectic phase exhibiting a higher order of alignment of liquid crystal molecules. The smectic liquid crystal molecules have a layer structure, wherein liquid crystal molecules are oriented such that their long-axis direction is aligned with or slightly tilted from a layer normal direction.

Liquid crystal molecules generally have a head-tail molecular structure due to no molecular symmetry. In smectic molecular layers, heat-tail type molecules are oriented in random directions. As a result, π-electron skeletons of liquid crystal molecules are not reasoned, and it is effective to impart a (molecular-structural) symmetry to the liquid crystal molecules so as to dispose π electron skeletons close to each other in smectic molecular layers, thus increasing the overlap integral of π-electron cloud. As a result, mobility of electrons is improved to provide an enhanced electron conductivity.

Even if complete symmetry of the molecular structure is not ensured, the above advantages are retained as far as liquid crystal molecules have a similar skeleton structure such that both of the terminal chains have an almost equal carbon number.

(3) Rotational Isomer (Conformer)

In a preferred embodiment of the present invention, it is also important that the probability of the presence of a stable rotational isomer or conformer is lowered as described below.

Isomers regarding internal rotation of molecule will be considered by comparing a biquinoline skeleton (structure) with a binaphthalene skeleton (structure) shown below.

A dihedral angle (φ) of a single bond indicated above is taken as φ1 (for biquinoline) and φ2 (for binaphthalene) (φ=zero deg. for the above conformations).

In the similar manner as in the above (1), the stability of a conformer is evaluated based on an energy calculation according to the semiempirical molecular orbital computation method (AM1 method).

As a result, in the case of the biquinoline skeleton, a resultant energy level shows a single minimum at a dihedral angle φ of 40 deg. (within the range of φ=0–180 deg.), but the binaphthalene skeleton provides two minimums at dihedral angles φ of 40 deg. and 140 deg.

Accordingly, the binaphthalene skeleton provides a higher probability of the presence of two conformers. On the other hand, in the case of the biquinoline skeleton, a probability of the presence of a single conformer is higher, so that a uniform intermolecular interaction takes place to increase the overlap integral of π electron cloud. As a result, the hopping probability is increased, thus improving electroconductivity.

In the present invention, the above-described three molecular design factors (1), (2) and (3) are not necessarily fulfilled at the same time.

Based on the above molecular design factors, we have found that it is possible to realize a luminescence device with a high luminescence efficiency by using the liquid crystal compound of formula (I) in a carrier transporting layer of an organic EL device.

Further, the liquid crystal compound of formula (I) is also applicable to an inorganic EL device.

The luminescence device (electroconductive device) with a high luminescence efficiency can be applied to products required to effect energy saving or provide a high luminance (brightness), such as a display apparatus, an illumination apparatus, a light source for a printer, and a backlight for a liquid crystal display apparatus. More specifically, as the display apparatus, it is possible to provide a flat panel display excellent in energy saving performance, recognizability and weight reduction. As the light source for a printer, it is possible to replace a laser light source of a laser beam printer widely used at present with the electroconductive device of the present invention. Image formation may be performed by disposing independently addressable devices in an array and subjecting a photosensitive drum to a desired exposure to light. By using the electroconductive device of the present invention, it is possible to remarkably reduce an apparatus volume. With respect to the illumination apparatus and the backlight, it is possible to expect an energy saving performance by using the electroconductive device of the present invention.

Further, by using the electroconductive device of the present invention, it is possible to realize a high joint efficiency to a metal or a high carrier mobility. As a result, when a current or voltage is intended to be efficiently supplied to a substance between a pair of electrodes, the electroconductive device of the present invention is applicable to various semiconductor devices in addition to the luminescence device.

Hereinbelow, specific but non-exhausive examples of the liquid crystal compound of formula (I) used in the electroconductive device of the present invention will be enumerated in the following Tables 5–15. Symbols $a_1$ to $a_{33}$ used for specifying ring structure for liquid crystal compounds shown in Tables 5–15 have specific skeletons (ring structures) shown in the following Tables 1–4.

TABLE 1

| Symbol | Name | Formula |
|---|---|---|
| $a_1$ | quinoline-2,6-diyl | |
| $a_2$ | | |
| $a_3$ | quinoline-3,7-diyl | |
| $a_4$ | | |
| $a_5$ | isoquinoline-3,6-diyl | |
| $a_6$ | | |

TABLE 1-continued

| Symbol | Name | Formula |
|---|---|---|
| a₇ | quinoxaline-2,6-diyl | |
| a₈ | | |

TABLE 2

| Symbol | Name | Formula |
|---|---|---|
| a₉ | [1,5]naphthyridine-2,6-diyl | |
| a₁₀ | [1,6]naphthyridine-3,7-diyl | |
| a₁₁ | | |
| a₁₂ | [1,7]naphthyridine-2,6-diyl | |
| a₁₃ | | |
| a₁₄ | [1,8]naphthyridine-2,6-diyl | |
| a₁₅ | quinazoline-2,6-diyl | |

TABLE 2-continued

| Symbol | Name | Formula |
|---|---|---|
| a₁₆ | | |
| a₁₇ | cinnoline-3,7-diyl | |

TABLE 3

| Symbol | Name | Formula |
|---|---|---|
| a₁₈ | cinnoline-3,7-diyl | |
| a₁₉ | pyrido[2,3-b]pyrazine-2-6-diyl | |
| a₂₀ | | |
| a₂₁ | pyrido[2,3-b]pyrazine-3-7-diyl | |
| a₂₂ | | |
| a₂₃ | pyrazino[2,3-b]pyrazine-2-6-diyl | |

TABLE 3-continued

| Symbol | Name | Formula |
|---|---|---|
| a$_{24}$ | pteridine-2,6-diyl |  |
| a$_{25}$ | |  |

TABLE 4

| Symbol | Name | Formula |
|---|---|---|
| a$_{26}$ | naphthalene-2,6-diyl |  |
| a$_{27}$ | 8-fluoroquinoline-2,6-diyl |  |
| a$_{28}$ | 5-chlorocinnoline-3,7-diyl |  |
| a$_{29}$ | 7-bromoquinoxaline-2,6-diyl |  |
| a$_{30}$ | 3,4-difluoroquinoline-2,6-diyl |  |
| a$_{31}$ | 5-trifluoromethylpyrido[2,3-b]-pyrazine-3,7-diyl |  |

TABLE 4-continued

| Symbol | Name | Formula |
|---|---|---|
| a$_{32}$ | 2-methylquinoline-3,7-diyl |  |
| a$_{33}$ | [1,8]naphthyridine-2,6-diyl |  |

TABLE 5

Formula (I) R-X-A-B-X'-R'

| No. | R | X | A | B | X' | R' |
|---|---|---|---|---|---|---|
| 1 | CH$_3$ | O | a$_1$ | a$_1$ | — | C$_7$H$_{15}$ |
| 2 | C$_8$H$_{17}$ | — | a$_1$ | a$_1$ | — | C$_{11}$H$_{23}$ |
| 3 | F | — | a$_1$ | a$_1$ | — | C$_{20}$H$_{41}$ |
| 4 | H | — | a$_1$ | a$_2$ | O | OC$_9$H$_{19}$ |
| 5 | C$_4$H$_9$ | O | a$_1$ | a$_2$ | — | C$_8$H$_{17}$ |
| 6 | C$_{12}$H$_{25}$ | O | a$_1$ | a$_2$ | — | C$_{10}$H$_{21}$ |
| 7 | C$_6$H$_{13}$ | O | a$_1$ | a$_2$ | O | C$_6$H$_{13}$ |
| 8 | C$_8$H$_{17}$ | O | a$_1$ | a$_2$ | O | C$_8$H$_{17}$ |
| 9 | C$_{11}$H$_{23}$ | O | a$_1$ | a$_2$ | O | C$_{11}$H$_{23}$ |
| 10 | C$_4$H$_9$OCH(CH$_3$)—CH$_2$(CH$_2$)$_4$ | O | a$_1$ | a$_2$ | O | (CH$_2$)$_4$CH$_2$CH—(CH$_3$)OC$_4$H$_9$ |
| 11 | C$_9$H$_{19}$ | O | a$_1$ | a$_2$ | O | (CH$_2$)$_6$OC$_3$H$_7$ |
| 12 | C$_5$H$_{11}$O(CH$_2$)$_3$ | O | a$_1$ | a$_2$ | O | (CH$_2$)$_3$OC$_5$H$_{11}$ |
| 13 | C$_5$H$_{11}$ | O | a$_1$ | a$_2$ | O | C≡CC$_6$H$_{13}$ |
| 14 | C$_5$H$_{11}$CH=CH | O | a$_1$ | a$_2$ | O | CH=CHC$_5$H$_{11}$ |
| 15 | C$_{10}$H$_{21}$ | S | a$_1$ | a$_2$ | S | C$_{10}$H$_{21}$ |
| 16 | C$_3$H$_7$ | — | a$_1$ | a$_2$ | — | C$_3$H$_7$ |
| 17 | C$_4$H$_9$ | — | a$_1$ | a$_2$ | — | C$_4$H$_9$ |
| 18 | C$_5$H$_{11}$ | — | a$_1$ | a$_2$ | — | C$_5$H$_{11}$ |
| 19 | C$_6$H$_{13}$ | — | a$_1$ | a$_2$ | — | C$_6$H$_{13}$ |
| 20 | C$_7$H$_{15}$ | — | a$_1$ | a$_2$ | — | C$_7$H$_{15}$ |

TABLE 6

| No. | R | X | A | B | X' | R' |
|---|---|---|---|---|---|---|
| 21 | C$_8$H$_{17}$ | — | a$_1$ | a$_2$ | — | C$_8$H$_{17}$ |
| 22 | C$_9$H$_{19}$ | — | a$_1$ | a$_2$ | — | C$_9$H$_{19}$ |
| 23 | C$_{10}$H$_{21}$ | — | a$_1$ | a$_2$ | — | C$_{10}$H$_{21}$ |
| 24 | C$_{11}$H$_{23}$ | — | a$_1$ | a$_2$ | — | C$_{11}$H$_{23}$ |
| 25 | C$_{12}$H$_{25}$ | — | a$_1$ | a$_2$ | — | C$_{12}$H$_{25}$ |
| 26 | C$_{18}$H$_{37}$ | — | a$_1$ | a$_2$ | — | C$_{18}$H$_{37}$ |
| 27 | C$_6$H$_{13}$ | — | a$_1$ | a$_2$ | — | C$_8$H$_{17}$ |
| 28 | C$_{11}$H$_{23}$ | — | a$_1$ | a$_2$ | — | C$_3$H$_7$ |
| 29 | C$_6$H$_{13}$ | COO | a$_1$ | a$_2$ | OOC | C$_6$H$_{13}$ |
| 30 | C$_5$H$_{11}$ | COO | a$_1$ | a$_2$ | COO | C$_{11}$H$_{23}$ |
| 31 | C$_2$H$_5$CH(CH$_3$)—CH$_2$(CH$_2$)$_4$ | OOC | a$_1$ | a$_2$ | COO | (CH$_2$)$_5$CH(CH$_3$)C$_2$H$_5$ |
| 32 | H | — | a$_1$ | a$_{26}$ | O | C$_4$H$_9$ |
| 33 | C$_8$H$_{17}$ | — | a$_1$ | a$_{26}$ | O | C$_5$H$_{11}$ |
| 34 | C$_{11}$H$_{23}$ | — | a$_1$ | a$_{26}$ | O | C$_{10}$H$_{21}$ |
| 35 | C$_9$H$_{19}$ | O | a$_1$ | a$_{26}$ | O | C$_9$H$_{19}$ |
| 36 | C$_{15}$H$_{31}$ | O | a$_1$ | a$_{26}$ | O | C$_7$H$_{15}$ |
| 37 | C$_{13}$H$_{27}$ | — | a$_1$ | a$_{26}$ | — | C$_3$H$_7$ |
| 38 | C$_6$H$_{13}$ | — | a$_1$ | a$_{26}$ | — | C$_6$H$_{13}$ |
| 39 | C$_9$H$_{19}$ | — | a$_1$ | a$_{26}$ | — | C$_9$H$_{19}$ |
| 40 | C$_3$H$_7$ | O | a$_2$ | a$_1$ | O | C$_{14}$H$_{29}$ |

TABLE 7

| No. | R | X | A | B | X' | R' |
|---|---|---|---|---|---|---|
| 41 | $C_7H_{15}$ | — | $a_2$ | $a_1$ | — | $C_7H_{15}$ |
| 42 | $C_{12}H_{25}$ | — | $a_2$ | $a_1$ | — | $C_{18}H_{37}$ |
| 43 | H | — | $a_2$ | $a_{26}$ | O | $C_4H_9$ |
| 44 | $C_8H_{17}$ | — | $a_2$ | $a_{26}$ | — | $C_{11}H_{23}$ |
| 45 | $C_5H_{11}$ | — | $a_2$ | $a_{26}$ | O | $(CH_2)_5OC_6H_{13}$ |
| 46 | $C_2H_5$ | O | $a_3$ | $a_3$ | — | $C_8H_{17}$ |
| 47 | $C_6H_{13}$ | — | $a_3$ | $a_4$ | — | $C_6H_{13}$ |
| 48 | $C_7H_5$ | — | $a_3$ | $a_4$ | — | $C_7H_5$ |
| 49 | $C_8H_{17}$ | — | $a_3$ | $a_4$ | — | $C_8H_{17}$ |
| 50 | $C_{12}H_{15}$ | — | $a_3$ | $a_4$ | — | $C_{12}H_{25}$ |
| 51 | $C_9H_{19}$ | O | $a_3$ | $a_4$ | O | $C_5H_{11}$ |
| 52 | $C_{10}H_{21}$ | — | $a_3$ | $a_{26}$ | O | $C_4H_9$ |
| 53 | $C_5H_{11}$ | — | $a_3$ | $a_{26}$ | — | $C_5H_{11}$ |
| 54 | $C_8H_{17}$ | — | $a_4$ | $a_3$ | — | $C_8H_{17}$ |
| 55 | $C_3H_7$ | — | $a_4$ | $a_{26}$ | O | $C_{10}H_{21}$ |
| 56 | $C_7H_{15}$ | — | $a_5$ | $a_5$ | — | $C_6H_{13}$ |
| 57 | $C_6H_{13}$ | O | $a_5$ | $a_5$ | — | $C_6H_{13}$ |
| 58 | $C_3H_7$ | O | $a_5$ | $a_6$ | — | $C_{11}H_{23}$ |
| 59 | H | — | $a_5$ | $a_6$ | O | $C_{16}H_{33}$ |
| 60 | $C_9H_{19}$ | O | $a_5$ | $a_6$ | O | $C_7H_{15}$ |

TABLE 8

| No. | R | X | A | B | X' | R' |
|---|---|---|---|---|---|---|
| 61 | $C_6H_{13}$ | — | $a_5$ | $a_6$ | — | $C_6H_{13}$ |
| 62 | $C_7H_{15}$ | — | $a_5$ | $a_6$ | — | $C_7H_{15}$ |
| 63 | $C_8H_{17}$ | — | $a_5$ | $a_6$ | — | $C_8H_{17}$ |
| 64 | $C_{13}H_{27}$ | — | $a_5$ | $a_6$ | — | $C_5H_{11}$ |
| 65 | $C_{10}H_{21}$ | — | $a_5$ | $a_{26}$ | O | $(CH_2)_5C{\equiv}CCH_3$ |
| 66 | $C_4H_9$ | — | $a_5$ | $a_{26}$ | — | $C_9H_{19}$ |
| 67 | $C_5H_{11}$ | — | $a_5$ | $a_{26}$ | — | $C_5H_{11}$ |
| 68 | $C_6H_{13}$ | — | $a_6$ | $a_5$ | — | $C_6H_{13}$ |
| 69 | $C_{12}H_{25}$ | — | $a_6$ | $a_5$ | — | $C_{12}H_{25}$ |
| 70 | $C_9H_{19}$ | — | $a_6$ | $a_{26}$ | O | $C_3H_7$ |
| 71 | $C_{10}H_{21}$ | — | $a_6$ | $a_{26}$ | — | $C_{10}H_{21}$ |
| 72 | $C_9H_{19}$ | — | $a_7$ | $a_7$ | — | $C_9H_{19}$ |
| 73 | $C_{10}H_{21}$ | — | $a_7$ | $a_7$ | — | $C_4H_9$ |
| 74 | $C_{11}H_{23}$ | — | $a_7$ | $a_8$ | O | $(CH_2)_7CH(CH_3)_2$ |
| 75 | $C_{17}H_{35}$ | O | $a_7$ | $a_8$ | — | $C_7H_{15}$ |
| 76 | $C_7H_{15}$ | — | $a_7$ | $a_8$ | — | $C_7H_{15}$ |
| 77 | $C_8H_{17}$ | — | $a_7$ | $a_8$ | — | $C_8H_{17}$ |
| 78 | $C_9H_{19}$ | — | $a_7$ | $a_8$ | — | $C_9H_{19}$ |
| 79 | $C_{10}H_{21}$ | — | $a_7$ | $a_8$ | — | $C_{10}H_{21}$ |
| 80 | $C_{11}H_{23}$ | — | $a_7$ | $a_8$ | — | $C_3H_7$ |

TABLE 9

| No. | R | X | A | B | X' | R' |
|---|---|---|---|---|---|---|
| 81 | $C_7H_{15}$ | — | $a_7$ | $a_{26}$ | O | $CH_3$ |
| 82 | $C_7H_{15}$ | — | $a_7$ | $a_{26}$ | OOC | $C_4H_9$ |
| 83 | $C_8H_{17}$ | — | $a_7$ | $a_{26}$ | — | $C_8H_{17}$ |
| 84 | $C_7H_{15}$ | — | $a_8$ | $a_7$ | — | $C_7H_{15}$ |
| 85 | $C_8H_{17}$ | — | $a_8$ | $a_7$ | — | $C_8H_{17}$ |
| 86 | $C_{12}H_{25}$ | — | $a_8$ | $a_{26}$ | O | $C_5H_{11}$ |
| 87 | $C_{18}H_{37}$ | — | $a_8$ | $a_{26}$ | — | $C_4H_9$ |
| 88 | $C_7H_{15}$ | — | $a_9$ | $a_9$ | — | $C_7H_{15}$ |
| 89 | $C_8H_{17}$ | — | $a_9$ | $a_9$ | — | $C_8H_{17}$ |
| 90 | $C_9H_{19}$ | — | $a_9$ | $a_9$ | — | $C_9H_{19}$ |
| 91 | $C_4H_9$ | — | $a_9$ | $a_9$ | — | $C_4H_9$ |
| 92 | $C_{15}H_{31}$ | — | $a_9$ | $a_9$ | — | $C_{15}H_{31}$ |
| 93 | $C_5H_{11}$ | — | $a_9$ | $a_9$ | — | $C_8H_{17}$ |
| 94 | $C_{10}H_{21}$ | — | $a_9$ | $a_9$ | — | $C_6H_{13}$ |
| 95 | $C_6H_{13}$ | — | $a_9$ | $a_{26}$ | COO | $(CH_2)_3OC_3H_7$ |
| 96 | $C_9H_{19}$ | — | $a_9$ | $a_{26}$ | — | $C_9H_{19}$ |
| 97 | $C_7H_{15}$ | — | $a_{10}$ | $a_{10}$ | O | $C_6H_{13}$ |
| 98 | $C_7H_{15}$ | — | $a_{10}$ | $a_{11}$ | — | $C_7H_{15}$ |
| 99 | $C_{10}H_{21}$ | — | $a_{10}$ | $a_{11}$ | — | $C_{10}H_{21}$ |
| 100 | $C_5H_{11}$ | — | $a_{10}$ | $a_{26}$ | O | $C_{11}H_{23}$ |

TABLE 10

| No. | R | X | A | B | X' | R' |
|---|---|---|---|---|---|---|
| 101 | $C_8H_{17}$ | — | $a_{10}$ | $a_{26}$ | — | $C_{12}H_{25}$ |
| 102 | $C_8H_{17}$ | — | $a_{11}$ | $a_{10}$ | — | $C_8H_{17}$ |
| 103 | $C_9H_{19}$ | — | $a_{11}$ | $a_{10}$ | — | $C_9H_{19}$ |
| 104 | $C_3H_7$ | O | $a_{11}$ | $a_{10}$ | — | $C_8H_{17}$ |
| 105 | $C_{18}H_{37}$ | O | $a_{11}$ | $a_{26}$ | O | $C_2H_5$ |
| 106 | $C_6H_{18}$ | — | $a_{12}$ | $a_{12}$ | — | $C_6H_{18}$ |
| 107 | $C_9H_{19}$ | — | $a_{12}$ | $a_{13}$ | — | $C_9H_{19}$ |
| 108 | $C_{10}H_{21}$ | — | $a_{12}$ | $a_{13}$ | — | $C_{10}H_{21}$ |
| 109 | $C_{11}H_{23}$ | — | $a_{12}$ | $a_{13}$ | — | $C_{11}H_{23}$ |
| 110 | $C_{12}H_{25}$ | — | $a_{12}$ | $a_{13}$ | — | $C_{12}H_{25}$ |
| 111 | $C_7H_{15}$ | — | $a_{12}$ | $a_{26}$ | O | $C_5H_{11}$ |
| 112 | $C_{13}H_{27}$ | — | $a_{12}$ | $a_{26}$ | — | $C_{10}H_{21}$ |
| 113 | $C_4H_9$ | — | $a_{13}$ | $a_{12}$ | — | $C_4H_9$ |
| 114 | $C_9H_{19}$ | — | $a_{13}$ | $a_{26}$ | S | $C_8H_{17}$ |
| 115 | $C_5H_{11}$ | — | $a_{14}$ | $a_{14}$ | — | $C_5H_{11}$ |
| 116 | $C_7H_{15}$ | O | $a_{14}$ | $a_{33}$ | — | $C_9H_{19}$ |
| 117 | $C_{10}H_{21}$ | — | $a_{14}$ | $a_{33}$ | O | $(CH_2)_3OC_5H_{11}$ |
| 118 | $C_7H_{15}$ | — | $a_{14}$ | $a_{33}$ | — | $C_7H_{15}$ |
| 119 | $C_{12}H_{25}$ | — | $a_{14}$ | $a_{33}$ | — | $C_{12}H_{25}$ |
| 120 | $C_8H_{17}$ | — | $a_{14}$ | $a_{26}$ | — | $C_4H_9$ |

TABLE 11

| No. | R | X | A | B | X' | R' |
|---|---|---|---|---|---|---|
| 121 | $C_6H_{13}$ | — | $a_{14}$ | $a_{26}$ | — | $C_6H_{13}$ |
| 122 | $C_3H_7$ | — | $a_{33}$ | $a_{14}$ | — | $C_{15}H_{31}$ |
| 123 | $C_8H_{17}$ | — | $a_{33}$ | $a_{26}$ | O | $C_8H_{17}$ |
| 124 | $C_3H_7$ | O | $a_{15}$ | $a_{15}$ | — | $C_{10}H_{21}$ |
| 125 | $C_7H_{15}$ | — | $a_{15}$ | $a_{15}$ | — | $C_7H_{15}$ |
| 126 | $C_5H_{11}$ | — | $a_{15}$ | $a_{16}$ | O | $C_7H_{15}$ |
| 127 | $C_4H_9$ | — | $a_{15}$ | $a_{16}$ | — | $C_4H_9$ |
| 128 | $C_5H_{11}$ | — | $a_{15}$ | $a_{16}$ | — | $C_5H_{11}$ |
| 129 | $C_6H_{13}$ | — | $a_{15}$ | $a_{16}$ | — | $C_6H_{13}$ |
| 130 | $C_7H_{15}$ | — | $a_{15}$ | $a_{16}$ | — | $C_7H_{15}$ |
| 131 | $C_8H_{17}$ | — | $a_{15}$ | $a_{16}$ | — | $C_8H_{17}$ |
| 132 | $C_{12}H_{25}$ | — | $a_{15}$ | $a_{16}$ | — | $C_3H_7$ |
| 133 | H | — | $a_{15}$ | $a_{26}$ | O | $C_{16}H_{33}$ |
| 134 | $C_{10}H_{21}$ | — | $a_{15}$ | $a_{26}$ | — | $C_{10}H_{21}$ |
| 135 | $C_8H_{21}$ | — | $a_{16}$ | $a_{15}$ | — | $C_8H_{17}$ |
| 136 | $C_{18}H_{37}$ | — | $a_{16}$ | $a_{15}$ | — | $C_{18}H_{37}$ |
| 137 | $C_6H_{13}$ | — | $a_{16}$ | $a_{26}$ | — | $C_6H_{13}$ |
| 138 | $C_{11}H_{23}$ | — | $a_{16}$ | $a_{26}$ | O | $C_2H_5$ |
| 139 | $C_8H_{17}C{\equiv}C$ | O | $a_{17}$ | $a_{17}$ | — | $C_{10}H_{21}$ |
| 140 | $C_9H_{19}$ | — | $a_{17}$ | $a_{18}$ | O | $C_3H_7$ |

TABLE 12

| No. | R | X | A | B | X' | R' |
|---|---|---|---|---|---|---|
| 141 | $C_7H_{15}$ | — | $a_{17}$ | $a_{18}$ | — | $C_7H_{15}$ |
| 142 | $C_8H_{17}$ | — | $a_{17}$ | $a_{18}$ | — | $C_8H_{17}$ |
| 143 | $C_9H_{19}$ | — | $a_{17}$ | $a_{18}$ | — | $C_9H_{19}$ |
| 144 | $C_{10}H_{21}$ | — | $a_{17}$ | $a_{28}$ | — | $C_{10}H_{21}$ |
| 145 | $C_5H_{11}$ | — | $a_{18}$ | $a_{17}$ | — | $C_5H_{11}$ |
| 146 | $C_7H_{15}$ | — | $a_{18}$ | $a_{26}$ | O | $C_{12}H_{25}$ |
| 147 | $C_8H_{17}$ | — | $a_{19}$ | $a_{19}$ | — | $C_8H_{17}$ |
| 148 | $C_4H_9$ | — | $a_{19}$ | $a_{20}$ | — | $C_4H_9$ |
| 149 | $C_7H_{15}$ | — | $a_{19}$ | $a_{20}$ | — | $C_7H_{15}$ |
| 150 | $C_{10}H_{21}$ | — | $a_{19}$ | $a_{20}$ | — | $C_{10}H_{21}$ |
| 151 | $C_8H_{17}$ | — | $a_{19}$ | $a_{26}$ | O | $C_{10}H_{21}$ |
| 152 | $C_7H_{15}$ | — | $a_{19}$ | $a_{26}$ | — | $C_7H_{15}$ |
| 153 | $C_9H_{19}$ | — | $a_{20}$ | $a_{19}$ | — | $C_9H_{19}$ |
| 154 | $C_{12}H_{25}$ | — | $a_{20}$ | $a_{26}$ | — | $C_5H_{11}$ |
| 155 | $C_8H_{17}$ | — | $a_{21}$ | $a_{21}$ | — | $C_8H_{17}$ |
| 156 | $C_6H_{13}$ | O | $a_{21}$ | $a_{22}$ | — | $C_{11}H_{23}$ |
| 157 | $C_{10}H_{21}$ | — | $a_{21}$ | $a_{22}$ | O | $C_4H_9$ |
| 158 | $C_5H_{11}$ | — | $a_{21}$ | $a_{22}$ | — | $C_5H_{11}$ |
| 159 | $C_{11}H_{23}$ | — | $a_{21}$ | $a_{22}$ | — | $C_{11}H_{23}$ |
| 160 | $C_4H_9$ | — | $a_{21}$ | $a_{26}$ | O | $C_{12}H_{25}$ |

TABLE 13

| No. | R | X | A | B | X' | R' |
|---|---|---|---|---|---|---|
| 161 | $C_{19}H_{39}$ | — | $a_{21}$ | $a_{26}$ | — | H |
| 162 | $C_{13}H_{27}$ | — | $a_{22}$ | $a_{21}$ | — | $C_3H_7$ |
| 163 | $C_7H_{15}$ | — | $a_{22}$ | $a_{26}$ | — | $C_7H_{15}$ |
| 164 | $C_5H_{11}$ | — | $a_{23}$ | $a_{23}$ | — | $C_5H_{11}$ |
| 165 | $C_7H_{15}$ | — | $a_{23}$ | $a_{23}$ | — | $C_7H_{15}$ |
| 166 | $C_{10}H_{21}$ | — | $a_{23}$ | $a_{23}$ | — | $C_{10}H_{21}$ |
| 167 | $C_4H_9$ | — | $a_{23}$ | $a_{23}$ | — | $C_9H_{19}$ |
| 168 | $C_{12}H_{25}$ | — | $a_{23}$ | $a_{26}$ | O | $(CH_2)_7CH(CH_3)$—$OC_2H_5$ |
| 169 | $C_3H_7$ | — | $a_{24}$ | $a_{24}$ | — | $C_3H_7$ |
| 170 | $C_6H_{13}$ | — | $a_{24}$ | $a_{25}$ | — | $C_6H_{13}$ |
| 171 | $C_7H_{15}$ | — | $a_{24}$ | $a_{25}$ | — | $C_7H_{15}$ |
| 172 | $C_8H_{17}$ | — | $a_{24}$ | $a_{25}$ | — | $C_8H_{17}$ |
| 173 | $C_{11}H_{23}$ | — | $a_{24}$ | $a_{25}$ | — | $C_{11}H_{23}$ |
| 174 | $C_9H_{19}$ | — | $a_{24}$ | $a_{26}$ | O | $C_5H_{11}$ |
| 175 | $C_6H_{13}$ | — | $a_{25}$ | $a_{24}$ | — | $C_4H_9$ |
| 176 | $C_{17}H_{35}$ | — | $a_{25}$ | $a_{26}$ | — | Cl |
| 177 | $C_{11}H_{23}$ | O | $a_{27}$ | $a_2$ | — | $C_7H_{15}$ |
| 178 | $C_8H_{17}$ | — | $a_{28}$ | $a_{26}$ | — | $C_9H_{19}$ |
| 179 | $CH_3$ | — | $a_{29}$ | $a_4$ | — | $C_{10}H_{21}$ |
| 180 | $C_9H_{19}$ | O | $a_{30}$ | $a_2$ | — | $C_{11}H_{23}$ |

TABLE 14

| No. | R | X | A | B | X' | R' |
|---|---|---|---|---|---|---|
| 181 | $C_4H_9$ | — | $a_{31}$ | $a_{25}$ | — | $C_{12}H_{25}$ |
| 182 | $C_{15}H_{31}$ | — | $a_{32}$ | $a_{26}$ | — | Br |
| 183 | $C_8H_{17}$ | — | $a_1$ | $a_4$ | — | $C_8H_{17}$ |
| 184 | $C_5H_{11}$ | — | $a_1$ | $a_6$ | — | $C_5H_{11}$ |
| 185 | $C_{12}H_{25}$ | — | $a_1$ | $a_6$ | — | $C_{12}H_{25}$ |
| 186 | $C_7H_{15}$ | — | $a_1$ | $a_7$ | — | $C_7H_{15}$ |
| 187 | $C_5H_{11}$ | — | $a_1$ | $a_8$ | — | $C_{11}H_{23}$ |
| 188 | $C_9H_{19}$ | — | $a_1$ | $a_9$ | — | $C_9H_{19}$ |
| 189 | $C_6H_{13}$ | — | $a_1$ | $a_{10}$ | — | $C_6H_{13}$ |
| 190 | $C_4H_9$ | — | $a_1$ | $a_{14}$ | — | $C_4H_9$ |
| 191 | $C_7H_{15}$ | — | $a_1$ | $a_{16}$ | — | $C_7H_{15}$ |
| 192 | $C_{11}H_{23}$ | — | $a_1$ | $a_{18}$ | — | $C_{11}H_{23}$ |
| 193 | $C_8H_{17}$ | — | $a_1$ | $a_{25}$ | — | $C_9H_{19}$ |
| 194 | $C_5H_{11}$ | — | $a_3$ | $a_6$ | — | $C_5H_{11}$ |
| 195 | $C_{10}H_{21}$ | — | $a_7$ | $a_{10}$ | — | $C_3H_7$ |
| 196 | $C_6H_{13}$ | — | $a_7$ | $a_{22}$ | — | $C_6H_{13}$ |
| 197 | $C_7H_{15}$ | — | $a_{14}$ | $a_{18}$ | — | $C_{10}H_{21}$ |
| 198 | $C_4H_9$ | — | $a_{15}$ | $a_{25}$ | — | $C_4H_9$ |
| 199 | $C_6H_{13}$ | — | $a_1$ | $a_{25}$ | — | $C_5H_{11}$ |
| 200 | $C_8H_{17}$ | — | $a_{24}$ | $a_{26}$ | — | $C_8H_{17}$ |

TABLE 15

| No. | R | X | A | B | X' | R' |
|---|---|---|---|---|---|---|
| 201 | $C_2H_5OC_3H_6$ | — | $a_1$ | $a_2$ | — | $C_2H_5OC_3H_6$ |
| 202 | $C_3H_7OC_3H_6$ | — | $a_1$ | $a_2$ | — | $C_3H_7OC_3H_6$ |
| 203 | $C_4H_9OC_3H_6$ | — | $a_1$ | $a_2$ | — | $C_4H_9OC_3H_6$ |
| 204 | $(CH_3)_2CHCH_2CH_2CH_2$ | — | $a_1$ | $a_2$ | — | $CH_2CH_2CH_2CH(CH_3)_2$ |
| 205 | $(CH_3)_2CHCH_2CH_2CH_2CH_2$ | — | $a_1$ | $a_2$ | — | $CH_2CH_2CH_2CH_2CH(CH_3)_2$ |
| 206 | $CH_3$<br>\|<br>$CH_3CH_2CH_2CH_2CH_2CH_2$ | — | $a_1$ | $a_2$ | — | $CH_3$<br>\|<br>$CH_2CH_2CH_2CH_2CH_2CH_3$ |

The above-mentioned liquid crystal compound of formula (I) is used in the carrier transporting layer as an electroconductive layer, such as an electron transporting layer (for transporting electrons) or a hole transporting layer (for transporting holes), whereby a current-voltage characteristic of a resultant electroconductive device is improved to achieve good device performance.

The electroconductive device of the present invention using the liquid crystal compound of formula (I) may be applied to an organic EL device or an inorganic EL device. For example, when the electroconductive device of the present invention is constituted as the organic EL device, by using the liquid crystal compound of formula (I) as a carrier transport material for the carrier transporting layer, it is possible to improve an injection and/or transporting performance of carriers (particularly electrons) from an electrode, thus attaining a good luminescence performance. The layer of liquid crystal compound of formula (I) (carrier transporting layer) is disposed between an electrode and a luminescence layer. In this case, the electrode may be an anode (electrode) or a cathode (electrode). Depending on the function (electron transporting function or hole transporting function) of the liquid crystal compound of formula (I), the carrier transporting layer may appropriately be disposed on the cathode side or on the anode side. In the case where the liquid crystal compound has both electron transport function and hole transport function, it is possible to dispose the carrier transporting layer between the cathode and the luminescence layer and between the anode and the luminescence layer.

Hereinbelow, the present invention will be described more specifically based on examples.

EXAMPLE 1

6,6'-bis(heptyl)-2,2'-biquinoline (Example Compound No. (20)) was prepared in the following manner.

(Step 1)

$(C_2H_5O)_2CHCH_2CH(OC_2H_5)_2 \longrightarrow C_2H_5OCH=CHCHO$ (i)    (ii)

In a 300 ml-round bottomed (eggplant-type) flask, 150.0 g (680.9 mM) of 1,1,3,3-tetraethoxypropane (i) and 13.6 g of 3%-p-toluenesulfonic acid aqueous solution were placed and stirred for 2 hours at 47–55° C. To the mixture, 16.4 g of water was added and further stirred for 3.5 hours at that temperature. After the reaction, the reaction mixture was cooled and subjected to distillation under reduced pressure to obtain 54.8 g of a crude ethoxyacrolein (ii) (pale yellow liquid (yield: 80.4%), boiling point (b.p.)=47–85° C./4100 Pa (31 Torr)).

(Step 2)

31.4 g (314 mM) of the above-prepared ethoxyacrolein (ii) and 300 ml of methanol were placed in a 1 liter-round bottomed flask. Under stirring on an ice bath, 23.4 g (122 mM) of p-heptylaniline was added dropwise to the mixture. After the reaction, the reaction mixture was left standing overnight in a refrigerator and then subjected to distillation-off of methanol under reduced pressure. The resultant reddish brown viscous liquid was purified by silica gel column chromatography (eluent: hexane/ethyl acetate=2/1) to obtain 17.3 g of β-(p-heptylanilino)acrolein (iv) (reddish brown crystal, yield: 57.8%).

(Step 3)

17.2 g (70.1 mM) of β-(p-heptylanilino)-acrolein (iv) prepared above and 103.2 g of conc.sulfuric acid were placed in a 300 ml-round bottomed flask and stirred for 5 hours at 77–82° C. After the reaction, the reaction mixture was cooled, followed by the addition of 1.0 kg of ice water and 48% NaOH aqueous solution under stirring so as to achieve pH=11. The mixture was extracted with toluene, and the organic layer was washed with water and dried with anhydrous sodium sulfate, followed by evaporation (under reduced pressure) to obtain a black liquid. The black liquid was purified by silica gel column chromatography (eluent: hexane/ethyl acetate=5/1) to obtain 11.2 g of 6-heptylquinoline (v) (orange liquid, yield: 70.4%).

(Step 4)

-continued

In a 500 ml-round bottomed flask, 6.00 g (59.3 mM) of diisopropylamine and 60 ml of tetrahydrofuran (THF) were placed. To the mixture, 34.3 ml of 1.6M-n-butylithiumhexane solution was added dropwise over 15 minutes at −20 to −10° C. under a dry nitrogen gas stream environment, followed by stirring at that temperature for 30 minutes. To the mixture held at that temperature under the nitrogen gas stream environment, a solution of 6.30 g (27.7 mM) of 6-heptylquinoline (v) (prepared in the step 3) in 31.5 ml of THF was added over 30 minutes, followed by stirring at that temperature for 30 minutes. To the mixture, a mixture of 6.30 g (27.7 mM) of 6-heptylquinoline (v), 5.9 g of HMPA (hexamethyl phosphoramide) and 63 ml of THF was added dropwise over 40 minutes at −70 to −69° C. under a dry nitrogen gas stream environment, followed by stirring at that temperature for 1.5 hours. Thereafter, the reaction mixture was warmed up to 0° C. over 2 hours and then stirred for 1 hour at 0–10° C. and further for 1 hour at 10–21° C., followed by standing overnight at room temperature. The reaction mixture was poured into ice water and extracted with toluene. The organic layer was washed with water and dried with anhydrous sodium phosphate, followed by evaporation. The residue was purified by silica gel column chromatography (eluent: toluene) and recrystallized from ethanol to obtain 2.9 g of 6,6'bis(heptyl)-2,2'-biquinoline (Ex. Comp. No. (20)) (pale yellow crystal, yield: 23.1%).

The thus obtained liquid crystal compound (Ex. Comp. No. (20)) showed the following phase transition series:

Phase transition temperature (° C.)

Cryst. $\xrightarrow{82}$ SmX $\xrightarrow{129}$ N $\xrightarrow{132}$ Iso.

Cryst.: crystal phase
N: nematic phase
Iso.: isotropic phase
SmX: un-identified higher-order smectic phase (based on polarizing microscope observation and enthalpy change during phase transition on a DSC (different scanning calorimeter) chart).

EXAMPLE 2

Figure 1:
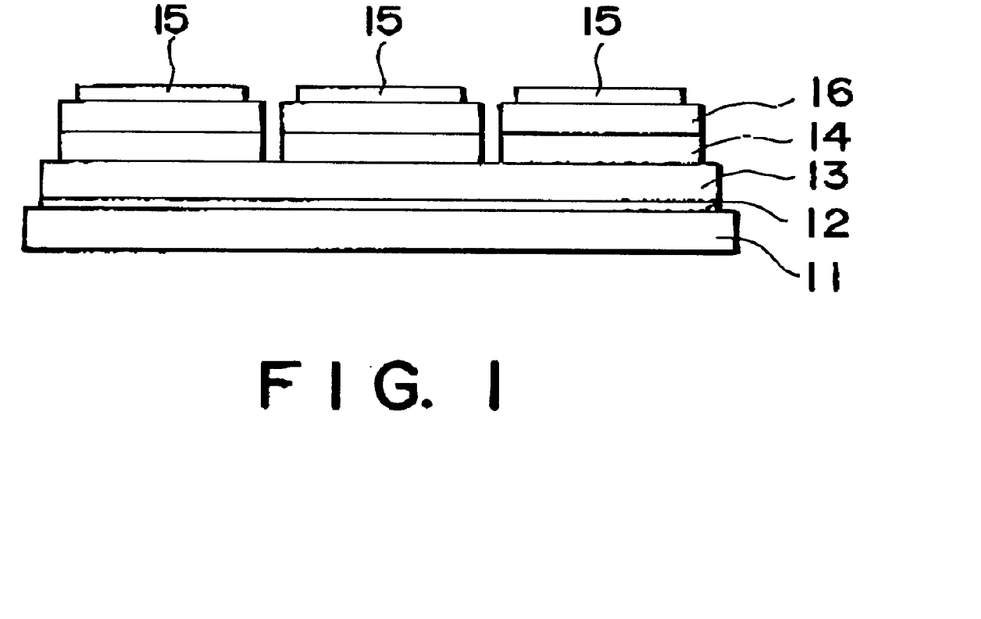
FIG. 1 is a schematic sectional view of an embodiment of an electroconductive device (organic EL device) according to the present invention.

An organic EL device (electroconductive device) having a sectional structure as shown in FIG. 1 was prepared by using the liquid crystal compound (Ex. Comp. No. (20)) prepared in Example 1 in the following manner.

On a 1 mm-thick glass substrate 11, a 70 nm thick ITO (indium tin oxide) film was formed as an anode (ITO electrode) 12 by sputtering and ultraviolet-light irradiation for surface treatment (cleaning).

The above-treated substrate 11 having the ITO film (anode) 12 was placed in a vacuum chamber held at a pressure of ca. $1.33 \times 10^{-3}$ Pa (ca. $1 \times 10^{-5}$ Torr), and a 50 nm-thick layer of α-NPD (bis[N-(1-naphthyl)-N-phenyl:benzidine) represented by a formula shown below was formed on the ITO film 12 as a hole (carrier) transporting layer 13 by (resistance heating) vacuum deposition at a rate of 0.1 nm/sec.

α-NPD

Under similar vacuum deposition conditions, three organic layer segments (luminescence layer segments) 14 exhibiting different luminescent wavelengths were respectively formed in a thickness of 50 nm on the hole transporting layer 13 by vacuum deposition. The three organic layers (luminescence layers) 14 were respectively formed of 95 wt. % Alq3 of a formula (a) shown below doped with 5 wt. % of perylene of a formula (b) shown below for shifting the luminescence wavelength to a shorter wavelength side, 95 wt. % Alq3 of the formula (a) doped with 5 wt. % of DCM (a styryl dye) of a formula (c) shown below for shifting the luminescence wavelength to a longer wavelength side, and Alq3 alone (providing a center luminescence wavelength).

On each of the luminescence layers 14, a 20-nm-thick layer of a smectic liquid crystal compound (Ex. Comp. No. (20)) was formed as an electron (carrier) injection layer 16 by vacuum deposition.

The thus-formed electron injection layer (liquid crystal layer) 16 was coated with cathode metals as a cathode electrode 15 each comprising a 10 nm-thick layer of Al—Li alloy (Al/Li=98.2/1.8 by weight) and a 150 nm-thick Al layer, respectively, formed by vacuum deposition to prepare an organic EL device as shown in FIG. 1.

(a)

Alq3

(b)

perylene (c)

DCM

The thus-prepared EL device was subjected to measurement of a current-voltage characteristic at a portion containing the luminescence layer 14 comprising Alq3 alone (i.e., free from the dopant of formula (b) or (c)) at 85° C. (within the smectic temperature range) by using a microammeter ("4140B", mfd. by Hewlett-Packard Co.) while temperature controlling the EL device on a hot stage with a temperature controller ("FP90", "FP-82", mfd. by Mettler Co.).

Figure 2:
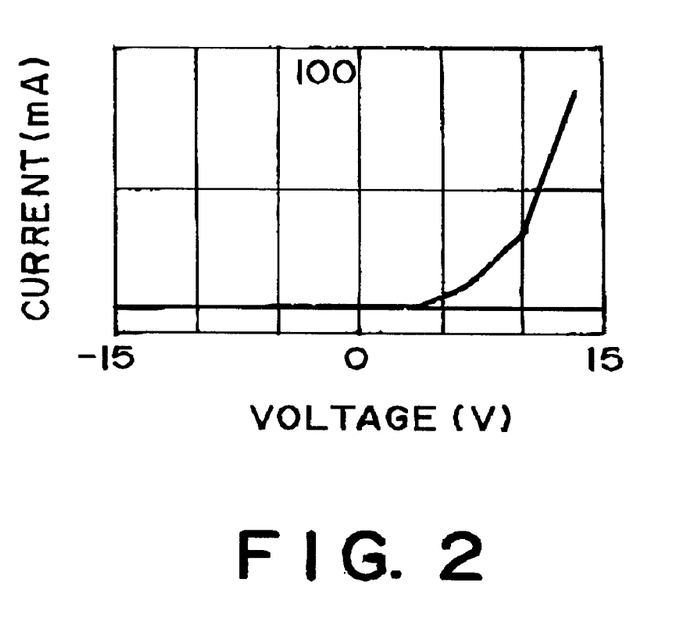
FIGS. 2, 3 and 6 are, respectively, a graph showing a current-voltage characteristic of an organic EL device (at a dopant-free portion of a luminescence layer) prepared in Example 2 (FIG. 2), Comparative Example 1 (FIG. 3) and Comparative Example 2 (FIG. 6) appearing hereinafter, respectively.

The results are shown in FIG. 2.

Referring to FIG. 2, the resultant current voltage curve showed that the EL device provided a good rectifying performance and a higher current density with respect to an applied electric field. Further, it was also confirmed that the EL device provided a higher luminance (brightness) in proportion to the current density. This may be attributable to an improvement in electron injection efficiency (performance) through the use of the liquid crystal compound of the formula (I) (Ex. Comp. No. (20) in this example).

COMPARATIVE EXAMPLE 1

An organic EL device was prepared and evaluated in the same manner as in Example 2, except that the electron injection layer 16 (of the liquid crystal compound (Ex. Comp. No. (20)) was not formed.

Figure 3:
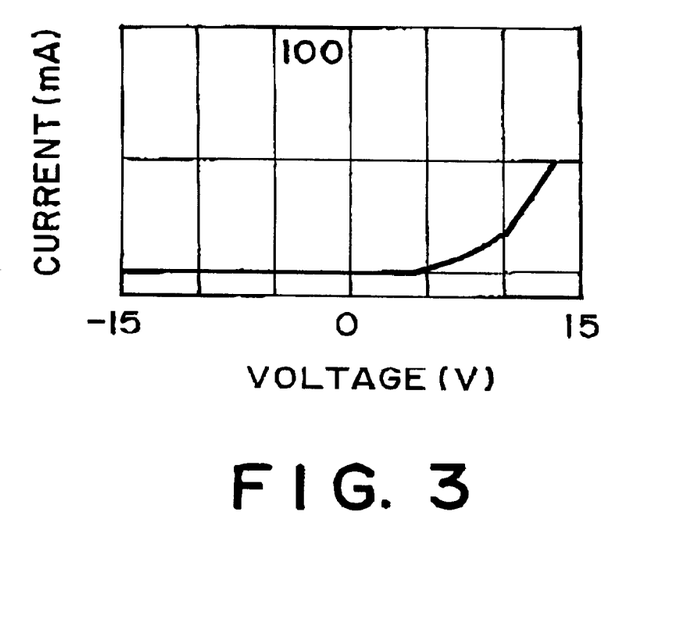

The results (current-voltage characteristic at 85° C.) are shown in FIG. 3.

Compared with FIG. 2 (Example 2), although a higher electric field strength (a smaller organic compound layer thickness) was applied, the EL device (of Comparative Example 1) provided smaller current values, thus resulting in an inferior electron injection performance.

COMPARATIVE EXAMPLE 2

6,6'-bis(heptyl)-2,2'-binaphthalene (LCReg 7508) described at page 124 of JP-A 10-312711 was synthesized through the following reaction scheme.

(Step 2)

In a 5 liter-three necked flask, 21.8 g (311 mM) of 1-pentene and 170 ml of THF were placed for dissolution, and under stirring in a nitrogen gas stream atmosphere, 673.4 ml of 0.5M-THF solution of 9-BBN(9-borabicyclo[3.3.1]nonane) was added dropwise at −25 to −20° C. over 15 minutes, followed by stirring for 1 hour at −10° C. and further for 3 hours at 5° C. Under stirring on an ice bath, to the reaction mixture, 6.75 g (5.84 mM) of Pd (PPh₃)₄ was added, and a solution of 79.6 g (287 mM) of 6-trifluoromethylsulfonyloxyquinoline in 1010 ml of DMF (methylformamide) was added dropwise, followed by the addition of 62.1 g of anhydrous potassium carbonate and then stirring for 10 minutes. The system was warmed and stirred at 50–54° C. for 3 hours. After the reaction, the reaction mixture was left standing for cooling and gradually poured into 3 liters of cool water, followed by extraction four times with 500 ml of toluene and washing of the organic layer with water. The organic layer was evaporated or condensed into ca. 1 liter thereof, followed by the addition of HCl so as to provide pH=1 and washing of the water layer (phase) with toluene. The water layer was alkalinized with 10% NaOH to pH=11 and extracted with toluene. The organic layer was dried and evaporated into a black liquid. The black liquid was purified by silica gel column chromatography (eluent: hexane/ethyl acetate=5/1) to obtain 42.6 g (yield: 74.4%) of 6-pentylquinoline.

(Step 3)

In a similar manner as in step 4 of Example 1 except for using 34.6 g (174 mM) of 6-pentylquinoline, 3.9 g (yield: 9.2%) of 6,6'-bis(pentyl)-2,2'-biquinoline (pale yellow crystal) was obtained.

Phase Transition Temperature (° C.)

Phase Transition Temperature (° C.)

SmE: smectic E phase

SmA: smectic A phase

An organic EL device was prepared and evaluated in the same manner as in Example 2, except that the above-prepared 6,6'-bis(heptyl)-2,2'binaphthalene was used in place of the liquid crystal compound (Ex. Comp. No. (20)) for the electron injection layer 16.

Figure 6:
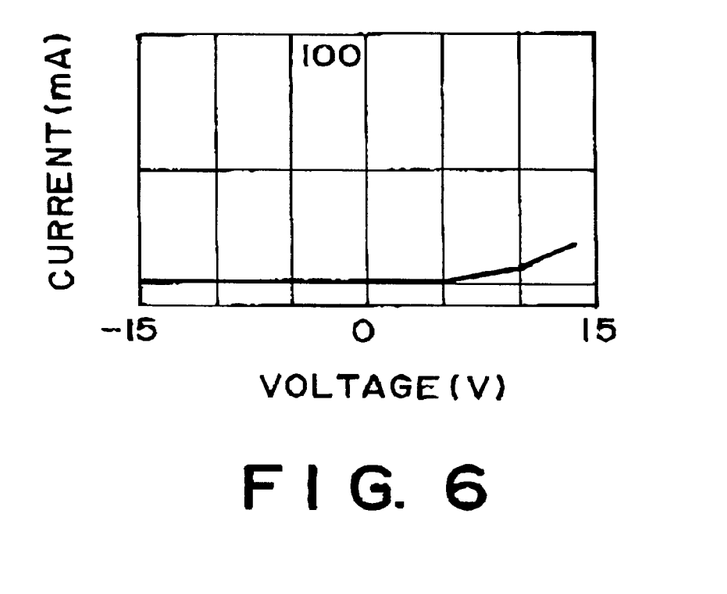

The results (current-voltage characteristic at 128° C.) are shown in FIG. 6.

The resultant current density given by the EL device was smaller than those given by the EL devices of Example 2 (FIG. 2) and Comparative Example 1 (FIG. 3).

Accordingly, the binaphthalene compound used in the EL device of Comparative Example 2 provided an electron injection performance inferior to not only the liquid crystal compound of formula (D (Ex. Comp. No. (20)) used in Example 1, but also the case of omitting the liquid crystal compound as in Comparative Example 1.

EXAMPLE 3

6,6'-bis(pentyl)quinoline (Ex. Comp. No. (18)) was prepared in the following manner.

(Step 1)

95.8 g (660 nM) of 6-hydroxyquinoline and 950 ml of pyridine were placed for dissolution in a 3 liter-three necked flask. To the solution, 279.3 g of (990 mM) of trifluoromethanesulfonyl anhydride was added dropwise at 5–13° C. over 85 minutes with stirring on an ice bath, followed by stirring for 3 hours at 20–23° C. The reaction mixture was gradually poured into 3 liters of cool water and extracted four times with 500 ml of toluene, followed by washing with 3NHCl (hydrochloric acid) and distilled water in succession and distilling-off of the solvent. The residue was purified by silica gel column chromatography (eluent: toluene/THF=20/1) to obtain 159.2 g (yield: 87.0%) of 6-trifluoromethylsulfonyloxyquinoline as a yellow oily product.

EXAMPLE 4

6-decylquinoline was synthesized from 6-trifluoromethylsulfonyloxyquinoline in the same manner as in Example 3 (yield: 66.3%).

By using the thus-prepared 6-decylquinoline, otherwise in a similar manner as in step 4 of Example 1, 6,6'-bis(decyl)-2,2'-biquinoline (Ex. Comp. No. (23)) (yield: 6.7%) was obtained.

Phase Transition Temperature (° C.)

EXAMPLE 5

6,6'-bis(butyl)-2,2'-biquinoline (Ex. Comp. No. (17)) was prepared in the following manner.

(Step 1)

38.6 (259 mM) of 4-butylaniline, 80.5 g (875 mM) of glycerin, 25.0 g of m-nitrobenzenesulfonic acid, 7.6 g of ferric sulfate and 13.2 g of boric acid were placed in a 500 ml-three necked flask. To the mixture, 47.4 ml of conc. sulfuric acid was added dropwise over 20 minutes with stirring on an ice bath, whereby the temperature was increased from 8° C. to 50° C. The mixture was heat-refluxed at 135–145° C. for 2 hours under stirring. After the reaction, the reaction mixture was poured into ice water and alkalinized with 20% NaOH aqueous solution to pH=11, followed by extraction with toluene. The organic layer was washed with water and evaporated. The residue was purified by silica gel column chromatography (eluent: toluene/THF) to obtain 31.9 g of 6-butylquinoline (yield: 66.6%).

(Step 2)

12.6 g (125 mM) of diisopropylamine and 126 ml of THF were placed in a 1 liter-three necked flask. To the mixture, under cooling on a dry ice-acetone bath in a nitrogen gas stream atmosphere, 73.3 ml (117 mM) of 1.6M-n-butyllithiumhexane solution was added dropwise over 30 minutes at (an internal temperature of) −20 to −30° C., followed by stirring for 1 hour at that temperature. To the mixture, a solution of 21.6 g (117 mM) of 6-butylquinoline in 150 ml of THF was added dropwise at −20 to −30° C. over 50 minutes, followed by stirring at that temperature for 1 hour. The mixture was warmed and stirred at ca. 10° C. for 4 hours and left standing overnight at room temperature. After the reaction, the reaction mixture was poured into ice water and extracted with toluene. The organic layer was washed with water and evaporated. The residue was washed with ethanol and purified by silica gel column chromatography (eluent: toluene) to obtain a yellow crystal, which was further purified by alumina column chromatography (eluent: toluene) to obtain 6.20 g (yield: 28.9%) of 6,6'-bis(butyl)-2,2'biquinoline.

Phase Transition Temperature (° C.)

EXAMPLE 6

6-propylquinoline was synthesized from 4 propylaniline in the same manner as in step 1 of Example 5 (yield: 53.7%).

Then, similarly as in step 2 of Example 5, 7.9 g of 6,6'-bis(propyl)-2,2'-biquinoline (Ex. Comp. No. (16)) was synthesized from 34.0 g (199 mM) of 6-propylquinoline (yield: 23.4%).

Phase Transition Temperature (° C.)

EXAMPLE 7

6-hexylquinoline was synthesized from 6-trifluoromethylsulfonyloxyquinoline in the same manner as in steps 1 and 2 of Example 3 (yield: 55.8%).

Then, similarly as in step 2 of Example 5, 6,6'-bis(hexyl)-2,2'-biquinoline (Ex. Comp. No. (19)) was synthesized from 6-hexylquinoline (yield: 18.2%).

Phase Transition Temperature (° C.)

EXAMPLE 8

6-(4-methylpentyl)quinoline was synthesized from 4-methyl]-pentene and 6-trifluoromethyl sulfonyloxyquinoline in the same manner as in steps 1 and 2 of Example 3 (yield: 56.4%).

Then, similarly as in step 2 of Example 5, 6,6'-bis-4-methylpentyl-2,2'-biquinoline (Ex. Comp. No. (204)) was synthesized from 6-(4-methylpentyl)-quinoline (yield: 18.9%).

Phase Transition Temperature (° C.)

EXAMPLE 9

6-(3-ethoxypropyl)quinoline was synthesized from allyl ethyl ether and 6-trifluoromethylsulfonyl-oxyquinoline in the same manner as in steps 1 and 2 of Example 3 (yield: 78.9%).

Then, similarly as in step 2 of Example 5, 6,6'-bis3-ethoxypropyl-2, 2'-biquinoline (Ex. Comp. No. (201)) was synthesized from 6-(3-ethoxypropyl)-quinoline (yield: 6.0%).

Phase Transition Temperature (° C.)

SmX1, SAmX2, SmX3: un-identified higher-order smectic phases

Incidentally, all the liquid crystal compounds including those prepared in Examples 1–9 do not exhibit a switching behavior in response to an applied voltage since they are not optically active.

As described hereinabove, according to the present invention, by using the above-mentioned liquid crystal compound of formula (I) as a material for injecting and/or transporting carriers (holes and electrons), particularly electrons, in a carrier transporting layer, it is possible to efficiently improve a carrier mobility and/or carrier injection performance from an electrode to achieve a high electro-conductivity. Further, the resultant liquid crystal electroconductive device (organic EL device) can stably exhibit a good luminescence characteristic based on the liquid crystal compound of formula (I).

What is claimed is:

1. An electroluminescence device comprising a pair of electrodes and a luminescence layer and a carrier transporting layer disposed between the electrodes, wherein the carrier transporting layer comprises a liquid crystal compound represented by the following formula (I):

wherein A and B independently denote a naphthalene-2, 6-diyl skeleton optionally substituted with one or two substituents selected from the group consisting of F, Cl, Br, $CH_3$ and $CF_3$, at least one of A and B comprising a naphthalene-2,6-diyl skeleton having one to four CH groups replaced with N;

wherein X and X' independently denote a single bond, —O—, —S—, —OOC— or —COO—; and wherein one of R and R' denotes H, F, Cl, Br, $CF_3$ or a linear or branched alkyl group having 1–20 carbon atoms, and the other one of R and R' denotes a linear or branched alkyl group having 3–20 carbon atoms, said alkyl groups for R and R' being independently capable of including one methylene group which can be replaced with —O—, —S—, —CH=CH— or —C≡C— with the proviso that heteroatoms are not adjacent to each other.

2. The device according to claim 1, wherein each of said naphthalene-2,6-diyl skeletons for A and B is selected from the group consisting of quinoline-2,6-diyl, isoquinoline-3,7-diyl, quinoxaline-2,6-diyl, [1,5]naphythridine-2,6-diyl, [1,6]naphthyridine-3,7-diyl, [1,7]naphthyridine-2,6-diyl, [1,8]naphthyridine-2,6-diyl, quinazoline-2,6-diyl, cinnoline-3,7-diyl, pyrido[2,3-b]pyrazine-2,6-diyl, pyrido[2,3-b]pyrazine-3,7-diyl, pyrazino[2,3-b]pyrazine-2,6-diyl, pteridine-2,6-diyl, and naphthalene-2,6-diyl.

3. The device according to claim 1, wherein in the formula (1), R, R', X, X', A and B satisfy the following relationships:
R=R' when R and R' are a linear or branched alkyl group having 3–20 carbon atoms, X=X' and A=B.

4. The device according to claim 1, wherein in the formula (1), A or B is quinoline-2,6-diyl.

5. The device according to claim 1, wherein in the formula (1), A and B are quinoline-2,6-diyl.

6. The device according to claim 1, wherein the luminescence layer is an organic luminescence layer.

7. The device according to claim 1, wherein the carrier transporting layer is an electron transporting layer for transporting an electron therein to produce a current flow.

8. The device according to claim 1, wherein the carrier transporting layer is a hole transporting layer for transporting a hole therein to produce a current flow.

9. The device according to claim 1, wherein the carrier transporting layer is disposed between the luminescence layer and at least one of the electrodes.

10. The device according to claim 1, wherein the carrier transporting layer includes a first carrier transporting layer disposed between the luminescence layer and one of the electrodes and a second charge transporting layer disposed between the luminescence layer and the other electrode.

11. The device according to claim 1, wherein the charge transporting layer and luminescence layer are formed in a single layer substantially free from their boundary.

12. A display apparatus comprising an electroluminescence device according to claim 1.

13. The device according to claim 1, wherein the liquid crystal compound exhibits a charge injection performance.

14. A process for producing an electroluminescence device of the type comprising a pair of electrodes and a luminescence layer and a carrier transporting layer disposed between the electrodes, the process comprising at least the following steps (a) and (b):

(a) forming a luminescence layer comprising a luminescent material between a pair of electrodes; and (b) forming a carrier transporting layer comprising a liquid crystal compound so as to be in contact with at least one of the pair of electrodes and the luminescence layer;

wherein the liquid crystal compound is represented by the following formula (I):

wherein A and B independently denote a naphthalene-2,6-diyl skeleton optionally substituted with one or two substituents selected from the group consisting of F, Cl, Br, $CH_3$ and $CF_3$, at least one of A and B comprising a naphthalene-2,6-diyl skeleton having one to four CH groups replaced with N;

wherein X and X' independently denote a single bond, —O—, —S—, —OOC— or —COO—; and wherein one of R and R' denotes H, F, Cl, Br, $CF_3$ or a linear or branched alkyl group having 1–20 carbon atoms, and the other one of R and R' denotes a linear or branched alkyl group having 3–20 carbon atoms, said alkyl groups for R and R' being independently capable of including one methylene group which can be replaced with —O—, —S—, —CH=CH— or —C≡C— with the proviso that heteroatoms are not adjacent to each other.

15. The process according to claim 14, wherein the carrier transporting layer is formed by vacuum deposition of the liquid crystal compound.

* * * * *

UNITED STATES PATENT AND TRADEMARK OFFICE
CERTIFICATE OF CORRECTION

PATENT NO.         : 6,884,477 B1
APPLICATION NO.    : 09/722642
DATED              : April 26, 2005
INVENTOR(S)        : Takao Takiguchi et al.

It is certified that error appears in the above-identified patent and that said Letters Patent is hereby corrected as shown below:

ON THE TITLE PAGE, ITEM (57), ABSTRACT

Line 9, "denote" should read --independently denote--.

COLUMN 11
Line 52, "2,6" should read --2,9--.
Line 52-58, should read --

COLUMN 24

Line 49, "comprises" should read --consists only of--.

COLUMN 25

Line 8, "naphythridine" should read --naphthyridine--.
Line 14, "wherein" should read --wherein R and R' are a linear branched alkyl group having 3-20 carbon atoms and wherein--.
Lines 16-17, "R=R' when R and R' are a linear or branched alkyl group having 3-20 carbon atoms," should read --R=R',--.

COLUMN 26

Line 10, "comprising" should read --consisting only of--.

Signed and Sealed this

Thirty-first Day of July, 2007

JON W. DUDAS
*Director of the United States Patent and Trademark Office*